(12) United States Patent
Talamantes et al.

(10) Patent No.: US 8,979,414 B2
(45) Date of Patent: Mar. 17, 2015

(54) CONNECTION SYSTEM

(71) Applicant: Deere & Company, Moline, IL (US)

(72) Inventors: Carlos Amilcar Talamantes, Saltillo (MX); Emmanuel Alejandro Garza, Saltillo (MX)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 14/067,298

(22) Filed: Oct. 30, 2013

(65) Prior Publication Data

US 2014/0169867 A1   Jun. 19, 2014

(51) Int. Cl.
*A47B 57/40* (2006.01)
*F16B 5/10* (2006.01)
*F16B 5/00* (2006.01)

(52) U.S. Cl.
CPC ............ *F16B 5/10* (2013.01); *F16B 5/0036* (2013.01)
USPC ......................... 403/252; 248/242; 211/191

(58) Field of Classification Search
CPC ...... B60N 2/015; B60N 2/0158; A47B 57/40; A47B 57/402; A47B 57/404; A47B 57/42; A47B 57/425
USPC ..................... 403/353, 252, 381, 254, 348
See application file for complete search history.

(56) References Cited

U.S. PATENT DOCUMENTS

| | | | | |
|---|---|---|---|---|
| 2,950,826 A * | 8/1960 | Degener | .................. | 211/191 |
| 3,089,675 A * | 5/1963 | Lozier | ................... | 248/242 |
| 3,101,681 A * | 8/1963 | Streater | ................. | 108/28 |
| 3,101,923 A * | 8/1963 | Streater | ................. | 248/242 |
| 3,300,170 A * | 1/1967 | Raffa | ..................... | 248/242 |
| 3,414,224 A * | 12/1968 | Watford et al. | ....... | 248/243 |
| 3,490,604 A * | 1/1970 | Klein | ..................... | 211/191 |
| 3,729,161 A * | 4/1973 | Christensen | .......... | 248/242 |
| 3,857,646 A * | 12/1974 | Warburton | ............ | 403/252 |
| 3,983,822 A * | 10/1976 | Suttles | .................. | 108/108 |
| 4,008,873 A * | 2/1977 | Travaglio et al. | ..... | 248/242 |
| 4,074,812 A * | 2/1978 | Skubic et al. | ......... | 211/192 |
| 4,098,480 A * | 7/1978 | Neumann | ............. | 248/243 |

(Continued)

FOREIGN PATENT DOCUMENTS

DE   3126096 A1   1/1983
DE   9107454 U1   9/1991

(Continued)

OTHER PUBLICATIONS

German Office Action for German Application No. 10 2012 021 308.5, dated Oct. 10, 2013 (6 pages).

(Continued)

*Primary Examiner* — Daniel P Stodola
*Assistant Examiner* — Daniel Wiley

(57) ABSTRACT

A connection system includes a sheet-metal part which is connected to a base plate. A connecting slot is formed in the base plate, and the sheet-metal part includes a connecting tab. The connecting tab includes a retaining region and a first stop. The connecting slot has a first end which faces towards and which is opposite the retaining region. The retaining region is inserted into the connecting slot in an assembly position. The retaining region includes a surface which engages an underside of the base plate in a connected position. The first stop is exposed in the assembly position. During the transition from the assembly position into the connected position, the first stop is inserted into the connecting slot and is brought into engagement with the first end of the connecting slot.

5 Claims, 3 Drawing Sheets

(56) References Cited

U.S. PATENT DOCUMENTS

| | | | | |
|---|---|---|---|---|
| 4,108,085 | A | * | 8/1978 | Shepherd et al. ............. 108/108 |
| 4,157,228 | A | * | 6/1979 | Hammerschlag ............. 403/252 |
| 4,341,486 | A | * | 7/1982 | Hammerschlag ............. 403/252 |
| 4,428,172 | A | * | 1/1984 | Larsson ...................... 52/489.1 |
| 4,618,064 | A | * | 10/1986 | Viklund ........................ 211/192 |
| 4,923,322 | A | * | 5/1990 | Burg ............................ 403/234 |
| 5,082,388 | A | * | 1/1992 | Lauterbach .................. 403/254 |
| 5,190,172 | A | * | 3/1993 | Tyson ........................... 211/191 |
| 6,431,632 | B1 | * | 8/2002 | Kozikowski et al. ...... 296/65.03 |
| 2004/0227041 | A1 | * | 11/2004 | Lewis ....................... 248/220.41 |

FOREIGN PATENT DOCUMENTS

| | | | | |
|---|---|---|---|---|
| DE | 29622396 | U1 | | 4/1997 |
| DE | 10108616 | A1 | * | 9/2002 ............. A47B 96/06 |
| DE | 10108616 | B4 | * | 1/2007 |
| EP | 1629230 | A2 | | 5/2006 |
| EP | 2062503 | A1 | | 5/2009 |
| GB | 1153392 | A | | 5/1969 |
| GB | 2347844 | A | | 9/2000 |
| GB | 2401030 | A | | 3/2004 |
| RU | 2203369 | C1 | | 4/2003 |
| RU | 2268843 | C1 | | 8/2005 |
| WO | 8806018 | A1 | | 8/1988 |
| WO | WO 9214383 | A1 | * | 9/1992 |
| WO | WO 9848666 | A1 | * | 11/1998 |
| WO | 0047089 | A1 | | 8/2000 |
| WO | WO 2004095981 | A1 | * | 11/2004 |
| WO | 2007096669 | A1 | | 8/2007 |

OTHER PUBLICATIONS

Eurasian Search Report for Eurasian Application No. 201301043, dated Feb. 3, 2014 (2 pages).

European Search Report for European Application No. 13188656.6, dated Feb. 6, 2014 (5 pages).

* cited by examiner

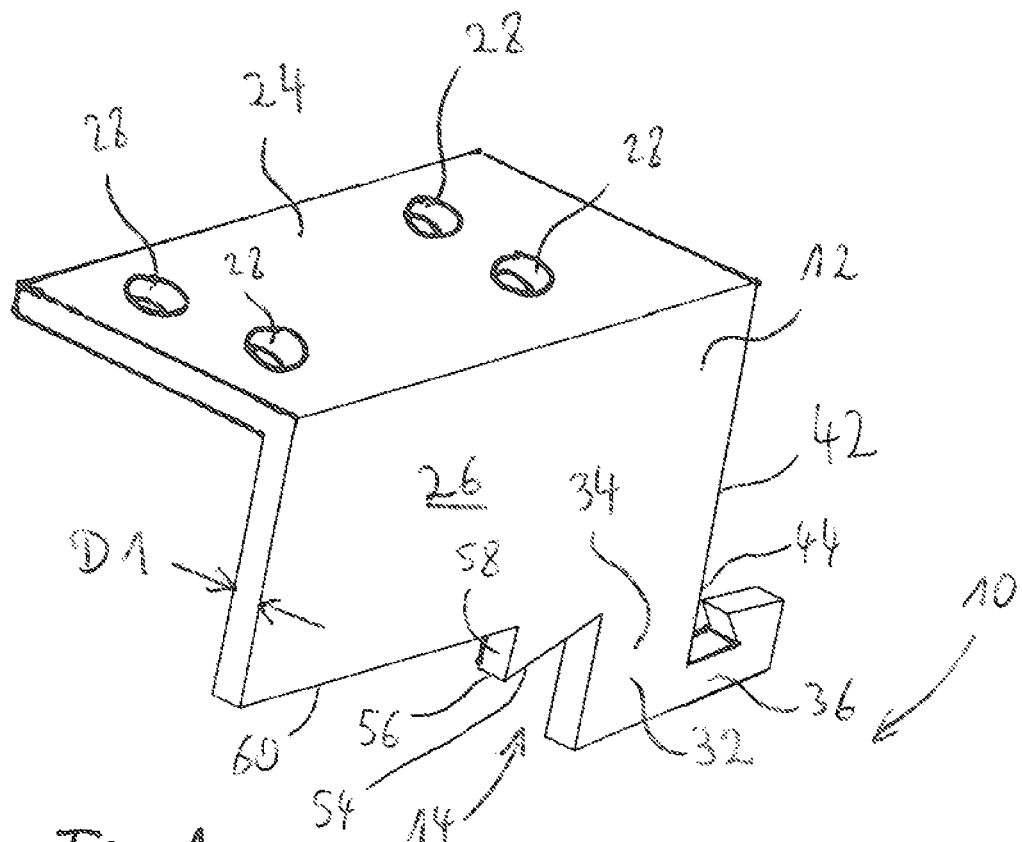
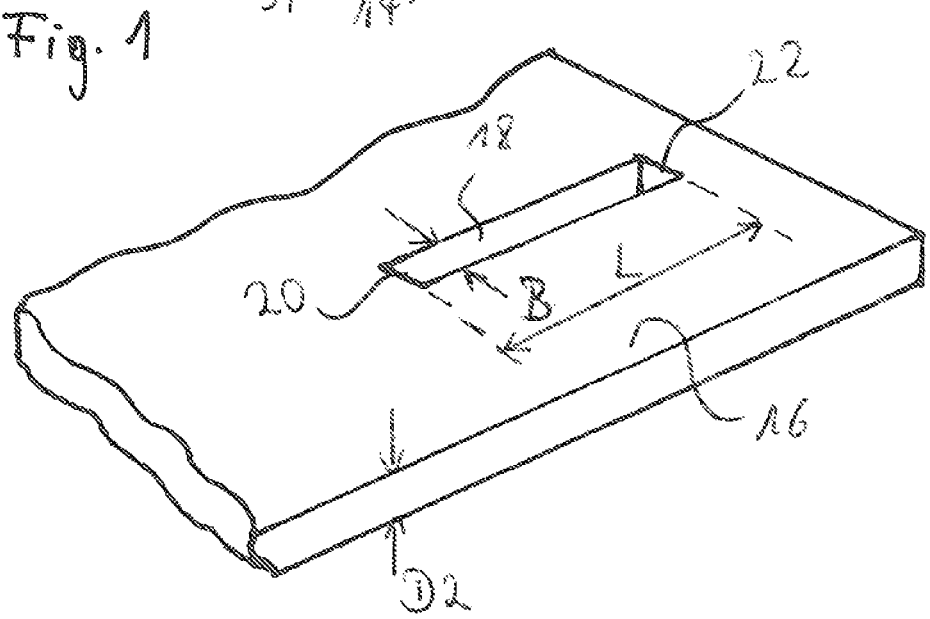
Fig. 1

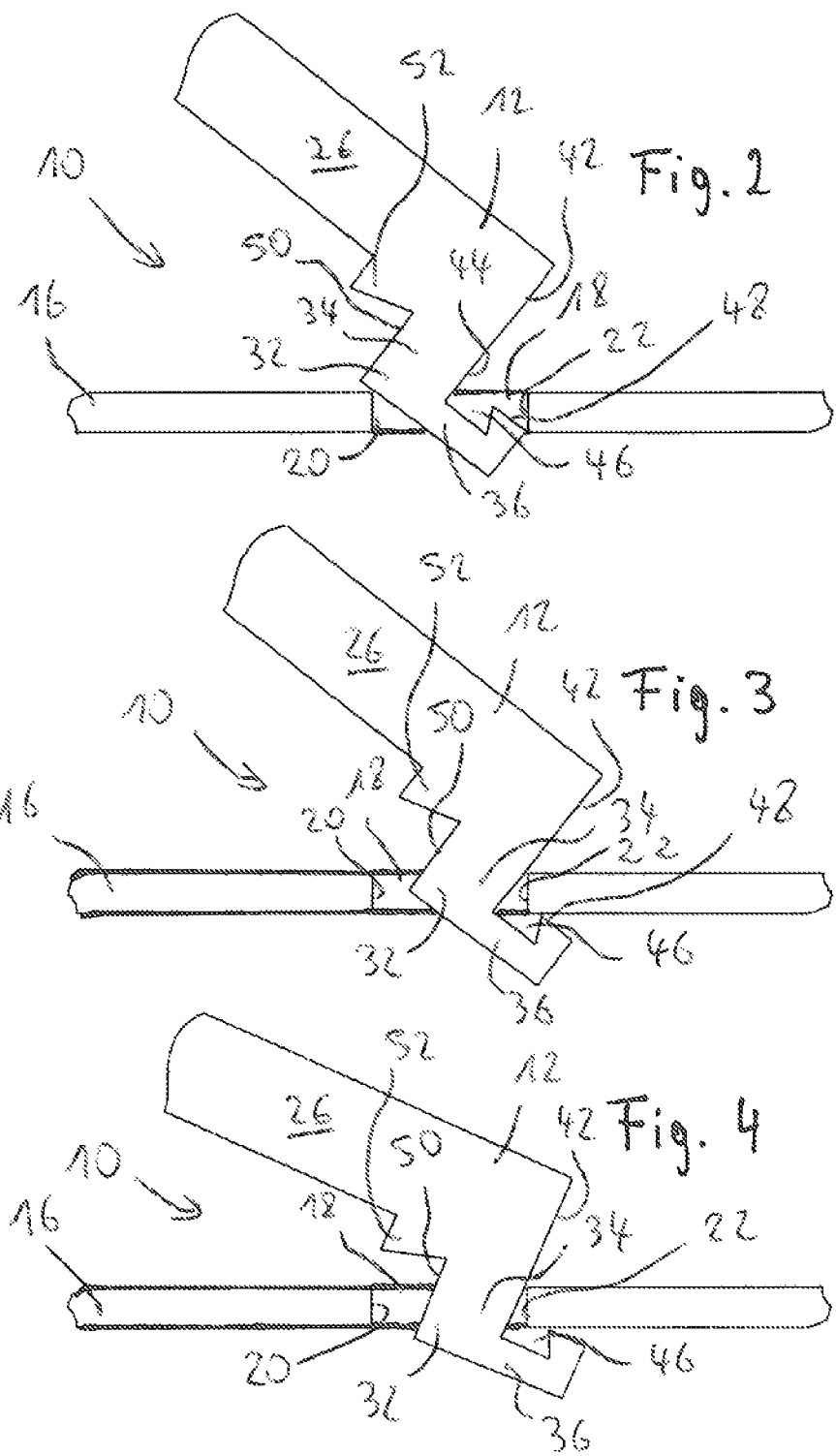

CONNECTION SYSTEM

FIELD

The present disclosure relates to a connection system having a sheet-metal part connected to a base plate.

BACKGROUND

Sheet-metal joints are produced during the manufacturing of construction machines or agricultural vehicles. Such joints are produced by welding or screwing. On the one hand, connection methods of this kind are often complex, and they also may not allow upstream painting of the component parts. However, a downstream painting operation also has disadvantages, especially as regards the accessibility of the component parts. Alternative methods, such as plug-in joints involving clamping or latching devices are known, but these can generally be used only in connecting thin sheet-metal or plastic parts. Moreover, thicker sheets, especially in a range above 1.5 mm, often lack the required flexibility, deformability or elasticity or have over-rigid material properties. Moreover, the known plug-in joints do not have the required strength, stability and reliability required for heavy machine construction. It is desired to provide a connection system of this type which overcomes the abovementioned problems.

SUMMARY

According to an aspect of the present disclosure, a connection system includes a sheet-metal part connected to a base plate. The base plate has a connecting slot. The sheet-metal part has a connecting tab which has a retaining region and a first horizontal stop. The retaining region can be inserted into the connecting slot in an assembly position of the sheet-metal part. The retaining region includes a surface which can be brought into engagement with an underside of the base plate in a connected position. The first horizontal stop is exposed in the assembly position of the sheet-metal part. During the transition from an assembly position into a connected position, the first horizontal stop can be inserted into the connecting slot and can be brought into engagement with a first end of the connecting slot. The first end is situated opposite the retaining region. Together with the first end of the connecting slot, the first stop prevents horizontal movement of the sheet-metal part in the direction towards the first end in the connected position. By means of the surface facing the underside of the base plate, the retaining region furthermore forms a vertical stop as soon as the retaining region is brought into engagement with the underside of the base plate. This vertical stop prevents vertical movement of the sheet-metal part in the connected position and prevents the sheet-metal part from moving out of the connecting slot and out of the base plate.

The retaining region can also include a second horizontal stop with a second end of the connecting slot. The second end being situated opposite the first end, thus preventing horizontal movement of the sheet-metal part in the direction towards second end in the connected position.

The retaining region can be designed as a retaining angle which can be brought into engagement with the underside of the base plate, in the connected position. The retaining angle can be formed by a first and a second leg, wherein the first leg extends vertically through the connecting slot in the connected position. Adjoining the first leg is a second leg which, in the connected position, extends horizontally in the direction of the second end of the connecting slot, on the underside of the base plate.

The first stop of the connecting tab can comprise an end face of a contour on the sheet-metal part. This end face faces the first end of the connecting slot. The contour extends from the retaining region towards the first end of the connecting slot and towards the underside of the base plate. The contour is designed so that there is a certain freedom of movement during the insertion of the connecting tab or of the retaining region into the connecting slot, in particular a transfer of the piece of sheet metal from an assembly position into the connected position.

A recess can also be formed on the retaining region, and, in the connected position, said recess extends from a tab surface that can be brought into engagement with the underside of the base plate and towards the connecting slot. The recess is designed so that a certain freedom of movement is allowed during the insertion of the connecting tab or of the retaining region into the connecting slot, in particular a transfer of the piece of sheet metal from an assembly position into the connected position and vice versa.

The connection system preferably includes a steel base plate. Other materials that have comparable rigid material properties can also be used, however. A sheet-metal part or sheet-metal part to be connected therewith, preferably likewise made of steel or some other material of comparable rigidity. The sheet-metal part, can be provided with one or more connecting tabs arranged in parallel in the manner explained above. As will be described in greater detail below, The connecting tab or tabs of the sheet-metal part is inserted into the connecting slot or slots in an assembly position which includes insertion of the connecting tabs on the sheet-metal part at a certain angle relative to the base plate. The geometrical design of the connecting tab, in particular horizontal and vertical stops, and also the recess on the retaining region are chosen so that they correspond to the dimensions of the connecting slot, in particular to the first and second ends. The same applies to the thickness of the sheet-metal part and to the width of the connecting slot. The connection system is suitable, in particular, for designs which require mounting or fastening of heavy component parts and/or components on a flat support, e.g. the base plate mentioned here. Thus, the sheet-metal parts can be provided with appropriate fastening holes or can be designed as clips. For example, this kind of connection system is suitable for sheet-metal joints on which a mounting or fastening for batteries, equipment units, tanks, frame components, transmissions or any other kind of housing is provided.

BRIEF DESCRIPTION OF THE DRAWINGS

FIG. 1 is a schematic perspective side view of a connection system according to the invention in a disassembled state;

FIG. 2 is a schematic side view of the connection system in a first assembly position;

FIG. 3 is a schematic side view of the connection system in a second, advanced assembly position;

FIG. 4 is a schematic side view of the connection system in a third, advanced assembly position;

DETAILED DESCRIPTION OF THE DRAWINGS

Figure 5:
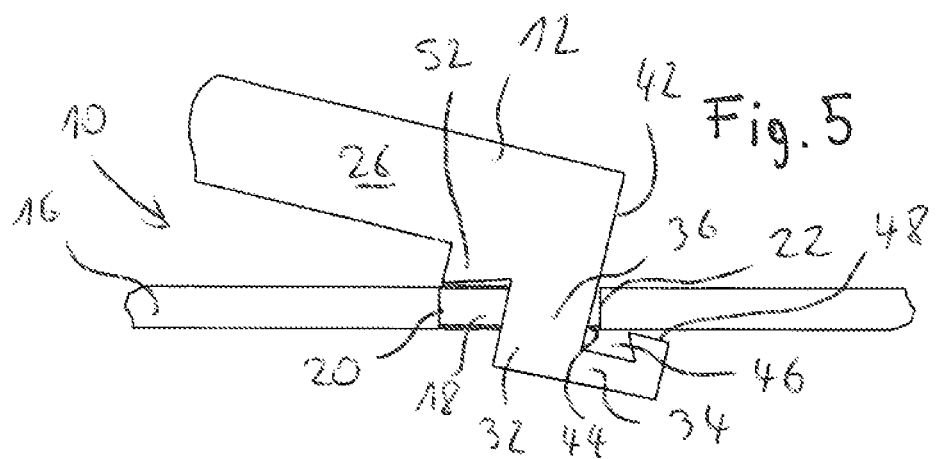
FIG. 5 is a schematic side view of the connection system in a fourth, advanced assembly position.
Figure 6:
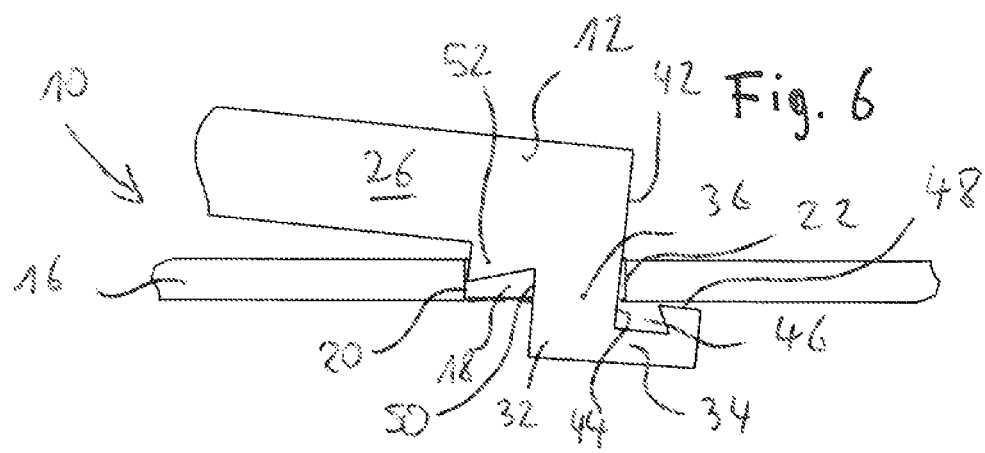
FIG. 6 is a schematic side view of the connection system in a fifth, advanced assembly position.

Referring to FIG. 1, a connection system 10 includes a sheet-metal part 12 having a connecting tab 14 and a base plate 16 with an elongate connecting slot 18. The slot 18 receives the tab 14. A thickness (D1) of the sheet-metal part 12 corresponds approximately to a width (B) of the slot 18, thus allowing the tab 14 to be inserted into the slot 18. The base plate 16 has a thickness D2. The connecting slot has a length L and is limited in its length L by a first end 20 and a second end 22.

By way of example, the sheet-metal part 12 is L-shaped or angled with a horizontally extending part 24 and a vertically extending part 26. Fastening holes 28 for fastening a component part (not shown) are arranged on the horizontal part part 24.

The downwardly extending tab 14 is formed on the vertical part part 26. The tab 14 has a retaining region 32. The retaining region 32 is designed as a retaining angle and includes a vertically aligned first leg 34 and a horizontally aligned second leg 36 joined to the first leg. With reference to a connected position of the connection system 10 (see FIG. 7), the second leg 36 extends on the same side as the second end 22 of the slot 18 and projects beyond an end 42 of the part 26 associated with said side. The first leg 34 ends flush with the end 42 of the part 26 at a side face 44 facing the second end 22 of the slot 18. The second leg 36 also includes a recess 46, which is arranged between a tab surface 48 facing an underside of the base plate 16 in the connected position and the side face 44 of the first leg 34. With the recess 46 and the surface 48, the second leg 36 forms a hook-shaped part.

A tooth-shaped stop 52 is formed on a second side 50 of the first leg 34 which is opposite from side face 44. The stop 52 forms a contour side or surface 54 (see especially FIG. 1) which extends obliquely downwards in a straight line from the second side 50 towards the first end 20 of the slot 18 to a tip 56. The stop 52 also forms an end face 58 which extends from the tip 56 to a lower side 60 of the part 26. The end face 58 faces the first end 20 of the slot 18 in a connected position of the sheet-metal part 12 and forms a stop surface for the stop 52.

Figure 7:
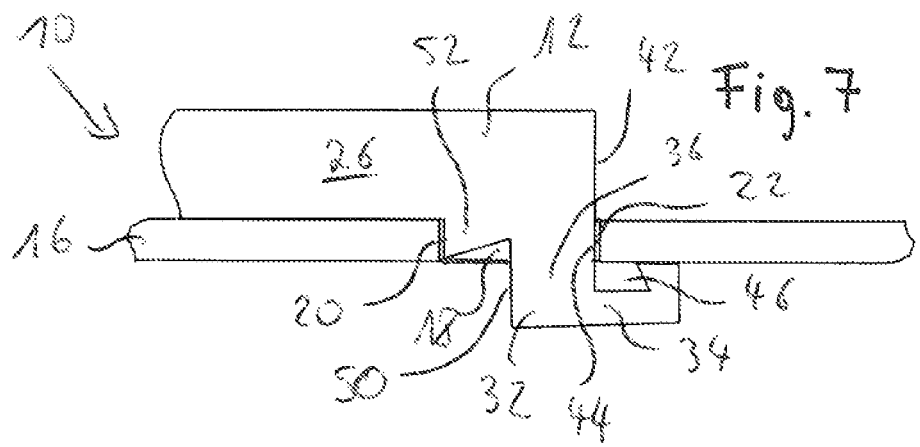
FIG. 7 is a schematic side view of the connection system in a connected position.

The sheet-metal part 12 is connected to the base plate 16 as shown in FIGS. 2 to 6 until the connected position shown in FIG. 7 is reached. In a first assembly position (FIG. 2), the sheet-metal part 12 is guided into the slot 18 at a first assembly angle with the second leg 36 in the lead. Here, the first assembly angle is chosen so that a lower edge and the surface 48 of the second leg just avoids colliding with the edges of the first and the second end 20, 22 of the connecting slot. The sheet-metal part 12 is inserted into the slot 18 in the same angular position until the side face 44 engages the second end 22 of the slot 18. The sheet-metal part 12 is rotated in the counter-clockwise direction and simultaneously inserted into the slot 18, and the assembly angle and the position of the tab 14 within the slot 18 is reduced so that (FIGS. 3 to 5) that the end face 58 of the offset 52 is lowered into the slot 18 (FIG. 6), and the lower side 60 of the sheet-metal part 12 comes to rest on the base plate 16. The recess 46 and the obliquely extending surface 54 ensure a collision-free transition from the assembly positions to the connected position, and vice versa if disassembly of the sheet-metal part is required. As the connected position is reached, the surface 48 engages the underside of the base plate 16 (FIG. 7). In the connected position illustrated, and in accordance with the embodiment of the tab 14 shown in the illustrative embodiment, the end face 58 of the stop 52 prevents horizontal movement of the sheet-metal part 12 in the direction of the first end 20 of the slot 18. The side face 44 of the first leg 34 furthermore forms a further stop with the second end 22 of the connecting slot and thus prevents horizontal movement of the sheet-metal part 12 towards the second end 22. Moreover, the surface 48 on the second leg 36 engages the underside of the base plate 16 and thus prevents vertical movement of the sheet-metal part 12 against the base plate 16 and prevents removal of the sheet-metal part 12 from the slot 20.

While the disclosure has been illustrated and described in detail in the drawings and foregoing description, such illustration and description is to be considered as exemplary and not restrictive in character, it being understood that illustrative embodiments have been shown and described and that all changes and modifications that come within the spirit of the disclosure are desired to be protected. It will be noted that alternative embodiments of the present disclosure may not include all of the features described yet still benefit from at least some of the advantages of such features. Those of ordinary skill in the art may readily devise their own implementations that incorporate one or more of the features of the present disclosure and fall within the spirit and scope of the present invention as defined by the appended claims.

The invention claimed is:

1. A connection system having a base plate, a sheet-metal part connected to the base plate, a connecting slot formed in the base plate, and a single connecting tab formed on the sheet-metal part, characterized in that:

the connecting slot is surrounded by first and second elongated side walls and first and second end walls, the end walls facing each other; and the connecting tab comprises a retaining region and a first stop rigid with respect to the retaining region, the retaining region being adapted to be inserted into the connecting slot in an assembly position of the sheet-metal part, the retaining region comprises a tab surface which engages an underside of the base plate in a connected position, and wherein the first stop is exposed in the assembly position of the sheet-metal part and, during a transition from the assembly position into the connected position, the first stop is inserted into the connecting slot and engages the first end wall, said first end wall facing towards the retaining region, and in the connected position the first and second end walls are engagable with the first stop and the retaining region of the connecting tab, respectively.

2. The connection system of claim 1, wherein:
the retaining region comprises a side face which engages the second end wall.

3. The connection system of claim 2, wherein:
in the connected position the retaining region engages an underside of the base plate, and the retaining region comprises a first leg which extends vertically through the connecting slot, and a second leg which adjoins said first leg, the second leg extending horizontally on the underside of the base plate and towards the second end wall of the connecting slot.

4. The connection system of claim 1, wherein:
the first stop comprises an end face and a contour surface, said end face facing the first end wall of the connecting slot, and the contour surface extending along an oblique path from the retaining region towards the first end wall of the connecting slot and towards the underside of the base plate.

5. The connection system of claim 1, characterized in that:
the retaining region includes a recess which extends from the tab surface and towards the connecting slot.

* * * * *